Figure 1:
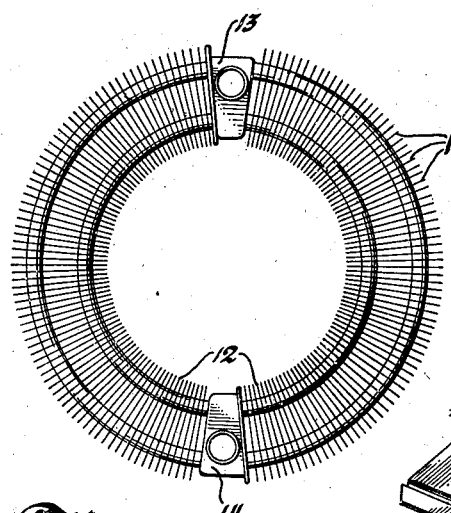

Feb. 24, 1942.  J. KARMAZIN  2,274,550

METHOD OF MAKING RIFLED EXTRUDED TUBES

Filed July 15, 1940

Inventor
John Karmazin
By
Blackmore, Spencer & Flint
Attorneys

Patented Feb. 24, 1942

2,274,550

UNITED STATES PATENT OFFICE 2,274,550

METHOD OF MAKING RIFLED EXTRUDED TUBES

John Karmazin, Grosse Ile, Mich., assignor to General Motors Corporation, Detroit, Mich., a corporation of Delaware Application July 15, 1940, Serial No. 345,589

5 Claims. (Cl. 113—118)

This invention relates to the manufacture of nested tube units, and the present application is a continuation in part of my pending application Serial No. 271,526 filed May 3, 1939.

Certain types of heat exchange cores consist of a stack of spaced fin plates, each having formed therein a series of short length tubes telescopically nested or fitted to the tubes of successive plates and then soldered or otherwise joined and sealed to provide an assembly of liquid flow tubes and heat radiating fins. The soldering or bonding of the parts is performed after the tube plates are stacked, by the insertion within the tubes of strips of fusible material and the placing of the assembly in an oven to melt the fusible material for its flow into the joints between the nested tube sections.

A commercially satisfactory seal at each of the several joints is one formed as disclosed in my prior Patent No. 2,133,990 by solder flow throughout the joint with a complete ring of bonding material extending unbrokenly from the interior to the exterior of the tube and a built-up fillet at the outer joint edge. Failure of the molten solder to flow outwardly between the tube surfaces causes bond failures and results when the molten material does not enter the joint or sets and hardens after moving in for only a short distance. Obstruction to the flow of bonding material between the tightly fitted tube sections is offered by surface dirt and for a good bond it is essential that the surface be thoroughly cleaned and degreased in the usual fluxing step of the solder operation.

In the interests of economical manufacture it is proposed that the cleaning be done after the tubes are in nested assembly rather than before the plates are stacked together and to insure free passage of the cleaning liquid between the wedged interfitted surfaces when the tubes are arranged in nested assembly and then immersed in the cleaning bath for conditioning the joint for the flow of molten solder, spacer ridges are formed in the tube walls, the spacing thereby provided enabling the cleaning liquid to enter and clear out all surface dirt throughout the length of the joint.

The formation of the spacer ridges is of importance when the core plates are formed of copper or other ductile material which otherwise may be fitted so tightly together under clamping pressure as to preclude the passage of the fluxing acid or cleaning liquid. Furthermore, incorporation of the spacer ridges makes more feasible the use of less expensive materials, such as steel, which quickly wears out ordinary punches because of its hardness, causes pitting and abrasion and gives other production troubles, such as the tendency of the punch to stick in the work. These troubles are eliminated through the use of a ribbing punch because the excess material flows into the grooves of the punch, forming the spacer ridges and relieving stress on the stock.

It is an object of this invention to form the tube sections to be nested in a manner to insure the flow of cleaning material between the nested tube walls. This is accomplished by working or squeezing the tube wall prior to assembly in a suitable die having therein a series of circumferentially spaced and axially extending small depth rifles or scratches to receive the material of the tube wall and define tiny spaced ridges in the wall surface for engagement with the surface of the mating wall of the joint and the maintenance of minute clearance space or channels between the closely fitted surfaces and which intervening space is for the free flow of cleaning material between the nested surfaces to insure subsequent reception of a thin layer of bonding material.

Figure 2:
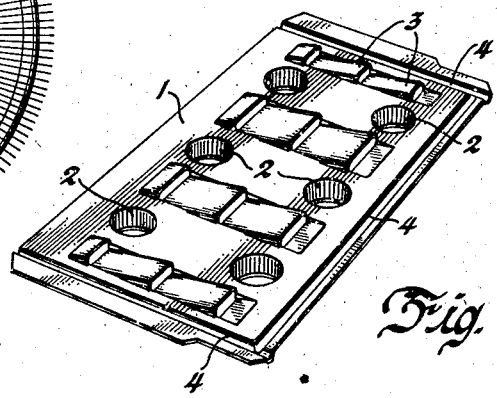
Figure 3:
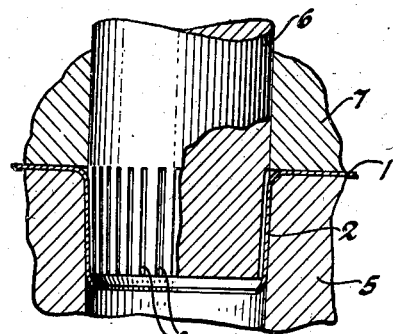
Figure 4:
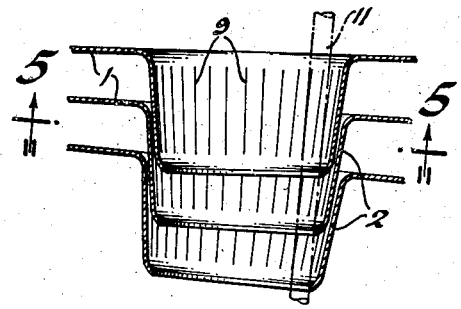

For a detail explanation reference will be made to the accompanying drawing wherein Figure 1 is an elevation showing a circular core assembly of a type used in automotive car heaters; Figure 2 is a detail perspective view of one of the core plates; Figure 3 shows the rifling die; Figure 4 is an enlarged view of a fragment of the core prior to the bonding operation and Figure 5 is a sectional view taken as on line 5—5 of Figure 4 but enlarged many times and illustrating the relation of the parts after the bonding operation.

Each core plate or fin 1, as shown in Figure 2, contains a series of tube sections 2 arranged in two rows of three each and when these are nested with corresponding tube sections of succeeding core plates there is provided a series of spaced water flow tubes. The fin plate may also contain air deflecting louvers or chutes between the tubes, as shown at 3, which are formed by slitting the plate at spaced intervals and bending the material on opposite sides of each slit above and below the plane of the fin. For stiffening purposes the plate may have reinforcing beads shown at 4 pressed therein adjacent its outer edge and its two sides. The several tube sections are made in the plate by pressing cup-like formations therein and then punching out the bottom of each cup. Each tube section is slightly tapered and in the case of a circular core assembly as in Figure 1, having a mean diameter of 6¾" and employing fifteen fins per 20°, the taper of the innermost tube sections should be in the nature of 1° 25' and the taper of the outermost tube sections should be in the nature of 1° 10'.

The rifling die includes a female member 5 and a male member or punch 6 reciprocable in the guide block 7 as shown in Figure 3. When the core plate 1 is clamped between the mating faces of the die members 5 and 7 with the tube section extending into the opening of the female member 5, the descent of the punch 6 will squeeze the wall of the tube section 2 with some of the metal entering the rifle or score lines 8 of the punch leaving the raised flutes or spacer ridges 9. For a tube section having a diameter of approximately .350" to be rifled on its inside with thirty-six flutes of approximately .0002" deep the rifling punch 6 should have a corresponding number of grooves 8 extending below the surface of the punch to a depth of approximately .005" and being of substantially V-shape in section. The figures and measurement data noted herein are intended primarily for illustrative purposes.

Figure 5:
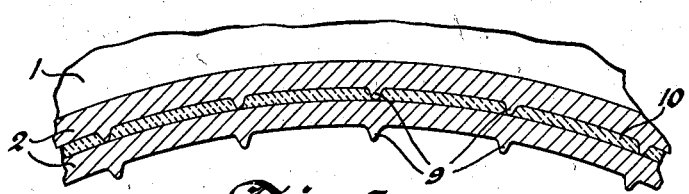

The rifled tapered tubes when stacked together as shown in Figure 4, even though considerable wedging or clamping pressure is exerted thereon, will nest together with the ribs 9 spacing the wall surfaces apart, as is better shown in the enlarged view, Figure 5, which also shows a thin layer 10 of bonding material occupying the space between the wall surfaces and serving to bond the parts securely against separation and leakage.

The application of the bonding material is best effected by inserting a wire or strip 11 of bonding material in each of the channels formed by the nested tube sections and placing the assembly in a baking oven to melt the bonding material for its flow into the joints. By reason of the clearance space in the joint the fluxing material in the conditioning operation will run through and remove grease or other surface accumulation for the presentation of clean joint surfaces whereby the bonding material will flow throughout the whole area of the nested tube surfaces and will tend to build up fillets at both the inner and outer ends of the joint insuring a reliable seal and a rugged assembly.

For a circular core assembly as in Figure 1, two sets of semi-circular core units 12 are made up and connected to the top and bottom headers 13 and 14. Hot water flowing between the headers through the core tubes will give up its heat to the air passing over the spaced fin plates in the usual manner.

I claim:

1. In the manufacture of nested tube devices formed of thin walled and relatively ductile material, the method of insuring built-up fillets of bonding material at the exterior and interior edges of the nested tube joints including, the production of spacer ridges on one surface of each tube wall to afford axially extending channels in the nested tube walls, immersing the nested tubes in a cleaning liquid bath for passage of the cleaning liquid through said channels from end to end of the nested joint surfaces and thereafter applying molten bonding material to said walls for flow through the channels from one joint edge to the other.

2. In the manufacture of nested tube devices, squeezing the tapered wall of a preformed tube section between inner and outer tapered die members, one of which contains a series of rifling grooves into which the material of the wall is extruded to form spacer ridges, then nesting several of such tube sections and immersing the nested tube assembly in a cleaning liquid bath for liquid passage through the intervening spaces afforded by said ridges to clean the nested surfaces between all of the nested tubes and subsequently applying molten solder to the edges simultaneously of all the joints for capillary flow throughout the several joints.

3. In the manufacture of nested tube assemblies, the method of insuring solder flow throughout the joints so as to fill the space therein and build up fillets at inner and outer joint edges, comprising squeezing the wall of each preformed tube between a pair of dies, one of which has rifling grooves therein into which the material of the wall is extruded to form spacer ridges, then nesting the ridged tubes and flowing cleaning liquid from one edge of the joint and between the nested tube surfaces spaced apart by the ridges to the other joint edge to clean the surfaces preparatory to introduction of solder therebetween and thereafter placing solder adjacent the joints and heating the assembly to melt the solder for its flow through the joints.

4. In the manufacture in ductile metal of nested tube cores involving the bonding of the tubes by the application of molten solder to the interior joint edges for flow through the joints to the exterior joint edges, the method of insuring the formation of corner fillets at the exterior joint edges comprising squeezing the preformed tube wall for pressing a series of circumferentially spaced ridges therein, then nesting the tubes with the ridges maintaining the wall surfaces in spaced apart relation, immersing the nested tubes in a cleaning liquid bath for the removal of surface impediments to the capillary flow of solder and thereafter inserting solder in the tube assembly and applying heat to melt the solder for its flow through all of the several joints.

5. In the manufacture of nested tube radiator cores, the method including preforming the thin walls of individual tube sections with circumferentially spaced ridges, stacking a plurality of tube sections in telescopic nested succession, immersing the assembly of tube sections in a cleaning liquid bath for the flow of cleaning liquid between the tube walls spaced apart by said ridges to clean the tube wall surfaces and condition the same for solder flow therebetween and adhesion thereto and thereafter flowing molten solder through the several joints.

JOHN KARMAZIN.